July 9, 1946.  E. B. COOK  2,403,502
SCREEN VIBRATING MECHANISM
Filed May 6, 1943
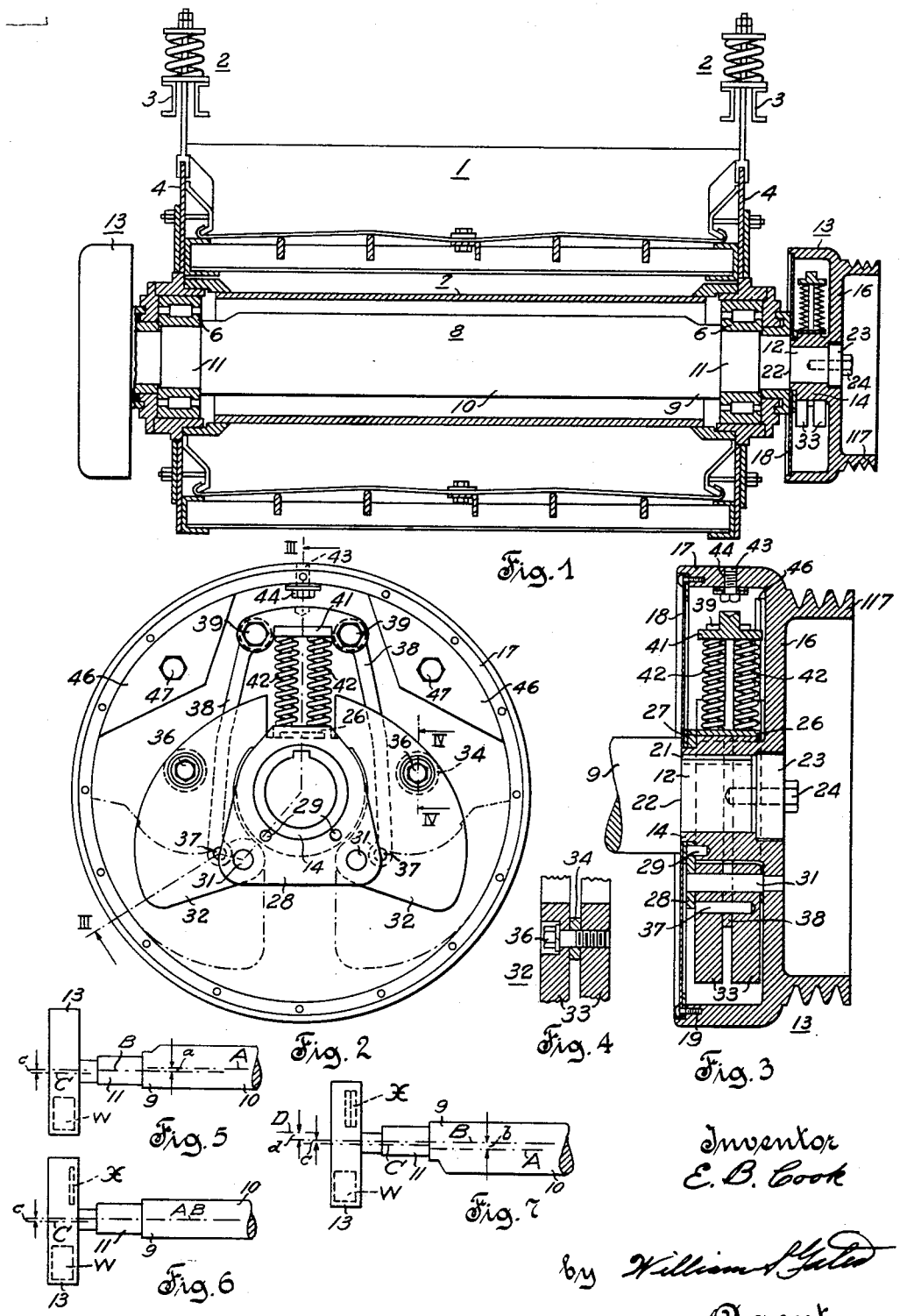

Patented July 9, 1946

2,403,502

UNITED STATES PATENT OFFICE 2,403,502

SCREEN VIBRATING MECHANISM

Eugene B. Cook, Milwaukee, Wis., assignor to Allis-Chalmers Manufacturing Company, Milwaukee, Wis., a corporation of Delaware Application May 6, 1943, Serial No. 485,820

9 Claims. (Cl. 74—61)

This invention relates to improved vibrating or gyrating mechanisms for screens and material treating devices.

An object of the invention is to provide a gyrating mechanism which is dynamically balanced about the axis of its supporting bearings during starting and stopping, and in which the balance wheels are true running under operating conditions.

A further object is to provide a compact normally true running unbalancing flywheel automatically balanced at low speeds about a low speed running axis offset from the wheel axis.

Other objects may appear in the following description.

In the installation of vibrating or gyratory screens or material treating apparatus such as screens for separating rock, ore, sand and other materials, it is often desirable to provide a machine in which the body is mounted for free vibration and provided with a free running vibrating mechanism rotatably supported entirely by the vibrating body. Ordinarily it is desired that this mechanism consist of a shaft rotatably journaled in alined bearings in the vibrating body and provided with one or more unbalanced flywheels mounted on shaft portions eccentric to the journal portions in order that the flywheels may rotate about a steady axis concentric with their rims during normal operation so that a true running belt drive may be applied directly to the rim of such a flywheel. The unbalanced weight of the flywheel is designed to balance the weight of the vibrated body in such a manner that the assembly is, during operation, dynamically balanced for gyration about an axis coincident with the axis of the flywheel. The vibrating body must be supported on springs, or other flexible mounting means, permitting relatively free motion in a plane.

It is well known that during starting and stopping of such a device the rotating mechanism must pass through a critical speed equal to the natural frequency of vibration of the mounting means. At this time the forces of vibration caused by the rotating unbalanced weight will cause abnormal motions of the vibrating body due to resonance effects causing dangerously excessive forces to be transmitted to the stationary foundation or support and often leading to strain or destruction of the belt drive. This invention deals with the use of a compact effective automatic balance wheel and the combination thereof with a rotating shaft structure, to provide a rotating structure which is dynamically balanced during starting and stopping, avoiding dangerous excessive vibration, and dynamically balanced with the vibrated body about a steady axis of gyration coincident with the wheel axis during normal operation.

The use of centrifugally operated balance weights in general in screen structures for the purpose of reducing dangerous forces during starting and stopping is old and well known and forms no part of this invention, which is concerned with the improved balance wheel and screen gyrating mechanism hereinafter specifically described and claimed.

In the drawing:

Fig. 1 is a vertical transverse cross-section of a screen embodying the invention with parts of the rotating structure shown in elevation;

Fig. 2 is a view on an enlarged scale of the automatic balance wheel with the shaft and cover plate removed;

Fig. 3 is a cross-section taken on the line III—III of Fig. 2 but with the cover plate and shaft in place;

Fig. 4 is a detail section on the line IV—IV of Fig. 2; and

Figs. 5, 6 and 7 are schematic representations of three different arrangements of counterweighting for the rotating structure according to the invention.

Like reference characters refer to similar parts throughout the several views of the drawing.

Fig. 1 shows a vibrated screen body 1 or other material treating structure mounted for free vibratory movement in a plane as by elastic supporting means 2 engaging stationary support 3 and having a natural frequency of vibration substantially less than operating speed of the body 1. Alternative supporting means may be used, as, for example, any well known resilient mounting secured to a floor or other stationary foundation. Screen body 1 is provided with side plates or frame members 4 in which are mounted alined bearings 6 of any known construction, shown as roller bearings which may be connected by a dust housing 7. Journaled in bearings 6 and wholly supported thereby is a rotary system, or gyrating mechanism 8 consisting of a shaft 9 having center portion 10, journal portions 11, and wheel mounting portions 12 which are eccentric to the journal portions by an amount which may be called the throw of the screen. In the illustrated embodiment the wheel mounting portions 12 are at the ends of the shaft 9, and on each is mounted an automatic balance wheel or flywheel 13 one of which may be provided with a concentric pulley rim 117, engageable by a driving belt or belts. Obviously the pulley rim 117 may be dispensed with and the belt arranged to directly engage the peripheral rim 17 of either of the flywheels 13.

Balance wheels or flywheels 13 each consist of a hub 14, a web 16 and a concentric peripheral rim 17. A cover plate 18 encloses the annular space between the hub 14 and rim 17 and may be secured to rim 17 as by screws 19 as shown in Figs. 2 and 3, or other known fastening means (not shown). The wheels 13 may be secured to the shaft as by ordinary keys 21, and held as against shoulders 22 by retaining washers 23 and cap screws 24 screwed in the shaft ends, or by any other known means (not shown). The hub 14 is flattened at one point to engage a spring seat 26, and relieved as at 27 to mount a spider plate 28 secured against rotation relative to the hub by dowel pins 29. Secured between the web 16 and spider plate 28 are spider or pivot pins 31 arranged in the annular space between hub 14 and rim 17 to one side of the hub 14 opposite to the spring seat 26. Pivoted on pins 31 are a pair of centrifugally operated weights 32 each formed as a pair of roughly half-crescent weight parts 33 spaced by spacers 34 and secured together as units by screws 36 as shown in detail in Fig. 4. The outer radius of curvature of the tip portions of these weights is substantially equal to the inner radius of the rim 17 and the pivots are so placed that the weights will swing outwardly to engage the rim 17 as a limiting stop as shown in broken lines in Fig. 2. The inner radius of weights 32 is about equal to the outer hub radius so that the weights may swing inwardly to embrace the hub, this form being calculated to secure a compact efficient wheel with the largest shift of effective balancing weight or moment consistent with reasonable size and economy of metal. In each weight 32 outward of the pivot pins 31, a link pin 37 bridges the gap between parts 33, forming a pivotal connection for a link 38. The links 38 pass between the tips of weight parts 33 and are pivotally connected as by pins 39 to a movable spring seat 41 arranged to face spring seat 26 on the hub. Compressed between spring seats 26 and 41 is a spring or plurality of springs 42. In the rim 17 opposite the spring seat 41 a tapped hole 43 may be provided to facilitate the precompression of spring 42 during assembly in an obvious manner, the hole being normally closed as by a screw plug 44. The wheels 13 may be provided with detachable, fixed counterweights 46 in the form of plates secured as shown adjacent rim 17 in the annular space clear of moving parts 32, 38 and 41. These may be fastened by screws 47 or other means as desired.

The weights of the shaft 9 and wheels 13 may be distributed in any of several related ways to achieve the desired results. As shown in Figs. 1 and 5 the weight of the center portion 10 of shaft 9 may be arranged to be concentrated in effect as on an axis A offset by an amount $a$ from the axis B of bearings 6 and journal portions 11, directly opposite to the offset $c$ of axis C of the wheel 13, which coincides in operation with the center of gyration of the screen.

As in Fig. 6, the center section 10 of shaft 9 may have its weight in effect concentrated in line with axis B of the bearings.

As in Fig. 7 the center section may have its effective axis A offset from axis B of the bearings in the same direction as the axis C is offset and by an amount even larger than $c$ as shown at $b$.

In Figs. 5, 6 and 7, the weights 32 in their outer position are represented by W; the weights 32 in their inner position (not shown) act as if concentrated on axis C. Counterweights 46 are represented by X.

In operation of the invention when the arrangement of weights as in Figs. 1 and 5 is used, the wheel may be designed so that without any counterweights 46, and with the weights 32 in their innermost position, wheels 13 are each statically and dynamically balanced about their axis C. In this case the weight of the wheels and wheel mounting portions 12 of shaft 9 may be considered as concentrated on axis C. The weight of center section 10 is arranged in construction to be sufficient so that its moment about axis B or the product of its weight times the offset $a$ equals the moment about axis B of wheels 13 or the product of the combined weight of wheels 13 and shaft portion 12 times the offset $c$. The rotating structure or system 8 as a whole will then, so long as the weights 32 are in their inner position, be dynamically balanced about axis B of the bearings 6. Now if power is applied to rotate the system 8 in starting, through a range of speeds up to and slightly beyond the natural frequency of supporting means 2, and springs 42 are precompressed to hold weights 32 in their inner position through such a range of speeds, the system 8 will rotate about axis B without gyrating the body 1. The wheels 13 will of course be gyrated in a small circle equal in radius to the offset $c$. The system may thus be brought to a speed above critical speed without causing excessive motion due to resonance of the supporting means 2.

As the speed becomes higher a point is reached at which the centrifugal force on the weights 32 overcomes the initial yielding force of springs 42 and the weights 32 move outwards to their outer position shown in broken lines in Fig. 2. The weights are so designed that the center of gravity of the flywheels is displaced by such an amount when the weights are in their outer position that the moment of the system about axis C will be equal and opposite to the moment of the vibrated body about the same axis, and the body will be gyrated about axis C while the wheels 13 rotate steadily about the same axis. During operation at such normal operating speed, it is seen that the belt drive to wheel rim 17, or pulley rim 117, will be substantially free of vibration, or true running.

In deceleration or stopping, the sequence of events reverses. The weights move to their inner position before resonant speed is reached, the screen will then stop vibrating and the system 8 will rotate about axis B until stopped, without causing excessive vibration of the body 1.

If the distribution of shaft weight is as shown in Fig. 6, counterweights 46, shown as X in Fig. 6, are attached to balance wheels 13 so that the wheels B and shaft portions 12 will be balanced for rotation about axis B with the weights 32 in their inner position. The action of the combination will be the same. The weights 32 will be designed to counterbalance the weight of the vibrating body about the axis C when in their outer position (shown at W) at operating speed. As in the device as arranged in Figs. 1 and 5, the system 8 will be dynamically balanced about axis B at low speeds with weights 32 in their inner position, with the body 1 stationary, and the system 8 and body 1 will be dynamically balanced for gyration about axis C at operative speeds with weights 32 in their outermost positions as at W.

As arranged in Fig. 7, center shaft section 10 is designed with its weight so distributed as to be effectively concentrated about axis A offset from axis B of bearings 6 in the same direction as axis C of wheels 13, and the amount of offset $b$ may be greater than offset $c$ of the wheels with relation to axis B. Fixed counterweights 46 are added to wheels 13 in sufficient amount (as shown at X) so that with weights 32 in their inner position the center of gravity of wheels 13 and shaft portions 12 are offset past axis B to such a position D that the moment or product of the weight of wheels 13 and shaft portions 12 times the offset ($d$) from axis B is equal and opposite to the product of the weight of shaft center portion 10 times its offset $b$ from axis B. As in the other arrangements of Figs. 1, 5 and 6, the weights 32 must be so designed that when they are in their outer position (shown at W) the system 8 and body 1 will be dynamically balanced for gyration about the axis C of the wheels 13.

By this invention it has been possible to produce a screen having compact, simple, automatic balance wheels in which the mechanism is dynamically balanced during starting and stopping, avoiding excessive motion due to resonance with the supporting means and at the same time one in which the vibrated body and operating mechanism are dynamically balanced for gyration about a steady axis coincident with the center of the balance wheels so that the balance wheels may be true running during screen operation thus avoiding destructive forces on the foundation and driving means during starting, stopping and running.

While specific embodiments of the invention have been described and illustrated, it is to be understood that such modifications and equivalents as may readily occur to those persons skilled in the art are included within the scope of the invention which is limited only by the scope of the appended claims.

It is claimed and desired to secure by Letters Patent:

1. A driving mechanism for a body suspended for free vibration in a plane, comprising a shaft rotatably mounted in alined bearings on said body, at least one eccentric portion on said shaft, a balancing wheel secured on said eccentric portion, means to rotate said wheel and shaft, said balancing wheel and shaft assembly being dynamically balanced on the axis of said bearings at predetermined speeds substantially below normal operating speed, a centrifugally operated weight in said wheel movable by centrifugal force to a position in which said wheel is unbalanced relative to its geometrically central axis at normal operating speed, said driving mechanism and said body being dynamically balanced relative to the geometrically central axis of said wheel at normal operating speed.

2. In a vibrating mechanism, a shaft having spaced axially alined bearing portions, at least one wheel mounting portion eccentric to the bearing axis, an automatic balance wheel concentrically mounted on said wheel mounting portion, means balancing said wheel and shaft for rotation about said bearing axis at speeds below a predetermined speed, and said wheel having a centrifugally operated weight movable to a position unbalancing said mechanism relative to said bearing axis at normal operating speeds.

3. The combination of a freely gyratable material treating device and a gyrating mechanism therefor, said gyrating mechanism being wholly supported in alined bearings in said device, said gyrating mechanism comprising an automatic balance wheel eccentric to said bearings, a centrifugally operated weight in said wheel arranged to balance said device and said mechanism for gyration about the geometrically central axis of said wheel at normal operating speeds, said wheel comprising elastic means acting in opposition to centrifugal force to move said weight to a position balancing said mechanism for rotation about the axis of said bearings at speeds below a predetermined speed less than normal operating speed.

4. The combination of an automatic balance wheel and a shaft for said wheel, said shaft having a bearing portion with its axis eccentric to said wheel, a centrifugally operable balancing weight in said wheel having an inner and an outer position, means urging said unbalancing weight to occupy said inner position at speeds substantially below a predetermined operating speed, said wheel and shaft being counterbalanced for rotation about said bearing axis when said balancing weight occupies its said inner position.

5. A material treating device resiliently mounted for free gyratory movement in a vertical plane, spaced bearings on said device, said bearings having a common axis perpendicular to said vertical plane, a dynamically balanced rotating system for gyrating said device comprising a shaft rotatably journaled in said bearings, said shaft having a center section between said bearings with its center of gravity offset from said bearing axis and coplanar with the center of gravity of said device, coaxial end sections on said shaft, offset from the said bearing axis oppositely to the center of gravity of said center section, automatic balance wheels of equal mass concentrically mounted on said end sections, centrifugally operated weights in said balance wheels so constructed and arranged that the moment of inertia of said wheels and end shaft sections is equal and opposite to the moment of inertia of said center shaft section about said bearing axis below a predetermined speed, said balancing weights being movable at a normal operating speed substantially above said predetermined speed to a position in which the moment of inertia of said rotating system about the axis of said wheels is equal and opposite to the moment of inertia of said device about the same axis, whereby said rotating system is dynamically balanced in starting and stopping and said device will be gyrated substantially about the geometrically central axis of said wheels at normal operating speeds.

6. A vibrating material treating device suspended for free movement in a plane, alined spaced bearings in said device, a rotary shaft for vibrating said device having alined journal portions mounted in said bearings, centrifugally operated automatic balance wheels on said shaft rotating at normal operating speed about a substantially steady axis concentric to the rims of said wheels, coincident with the center of normal motion of said device and offset from the axis of said bearings, said wheels and shaft being dynamically balanced for rotation on the axis of said bearings at speeds substantially below a predetermined speed and means for rotating said shaft.

7. A centrifugally operated balance wheel for a gyrating device comprising a central hub member, an annular rim on said wheel concentric with said hub, a counterbalance in said wheel, centrifugally operated, movable weights in said wheel, means urging said movable weights toward an inner position in which the center of gravity of the wheel is offset from the geometrically central axis thereof toward said counterbalance, said movable weights being movable by centrifugal force at a speed above a predetermined speed to an outer position in which the center of gravity of said wheel is offset to a point diametrically opposite to said counterbalance.

8. An automatic balancing wheel comprising a central hub having a radial web, an annular rim concentric with said hub, a pair of balancing weights pivotally mounted on said web to one side of said hub, each said weight comprising a pair of spaced plates connected by a pin eccentric to the pivotal axis of said weight, spring means engaging said wheel, movable spring engaging means, a pair of connecting rods pivotally connected to said spring engaging means and operatively connected to said pins, said spring means operatively opposing outward motion of said weights, said weights being movable by centrifugal force to unbalance said wheel at speeds of rotation above a predetermined minimum.

9. In a rotating system for imparting gyratory motion to a mass resiliently supported for free vibration in at least one plane, a shaft journaled in bearings in said mass, a rotary drive wheel mounted on said shaft geometrically eccentric to the axis of said bearings, movable weights in said wheel biased radially inwards toward an inner limiting position of rest and movable radially outwards by centrifugal force against said biasing force to an outer limiting position by rotation of said wheel at a speed above a predetermined minimum operating speed greater than the natural frequency of vibrations of said resiliently supported mass, said weights being so proportioned and arranged in relation to said system as to balance said mass for gyration about an axis eccentric to said bearing axis and substantially coincident with the geometrical axis of said wheel when in their outer limiting position, and to cause the axis of gyration of said mass to shift towards the axis of said bearings upon motion of said weights inwardly towards their inner position at speeds below said predetermined minimum operating speed.

EUGENE B. COOK.